L. R. HAIGHT.
AMALGAM MIXER FOR DENTISTS.
APPLICATION FILED MAR. 17, 1921.
1,377,680.
Patented May 10, 1921.
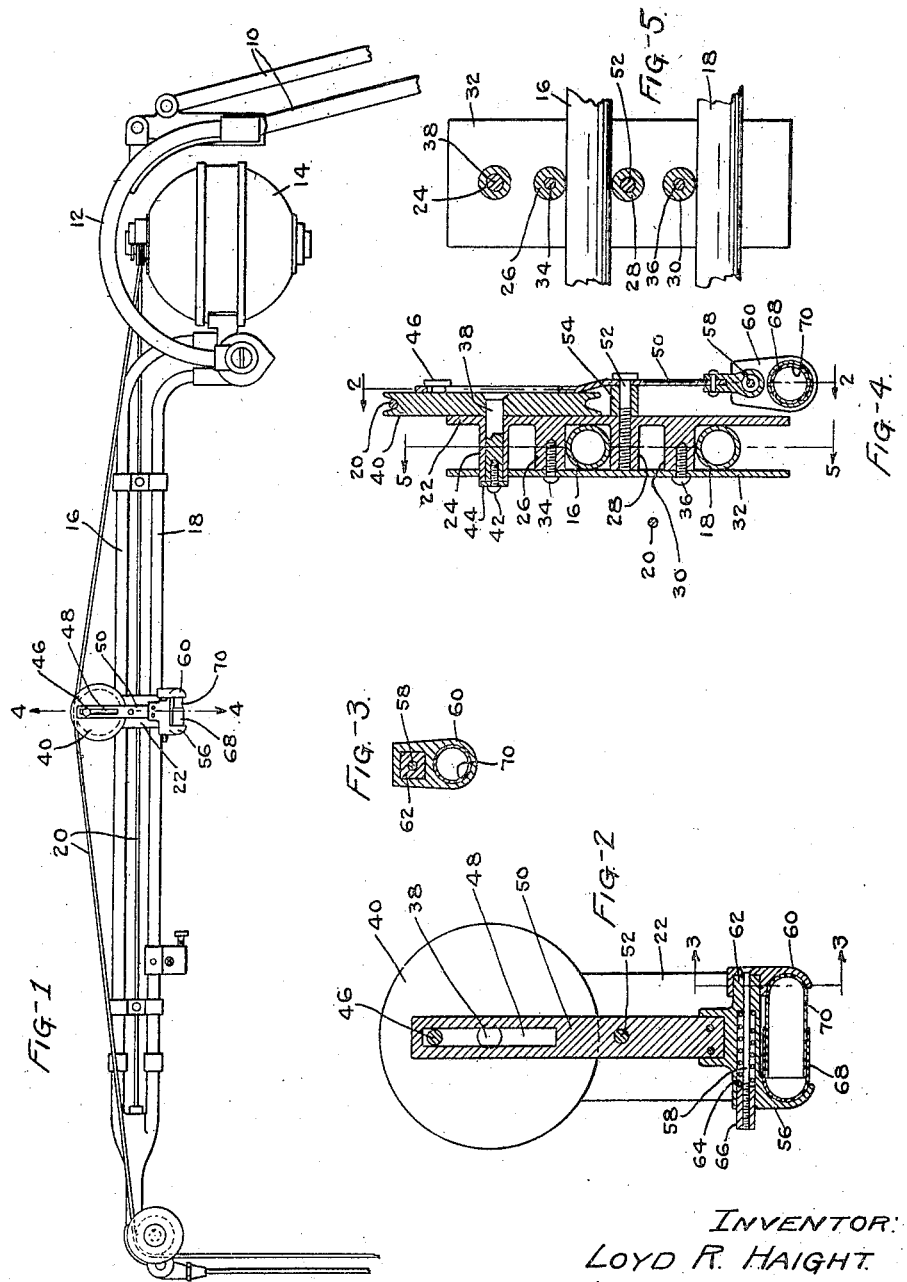
INVENTOR:
LOYD R. HAIGHT.
BY Whiteley and Ruckman
ATTORNEYS.

UNITED STATES PATENT OFFICE.

LOYD R. HAIGHT, OF SPOKANE, WASHINGTON.

AMALGAM-MIXER FOR DENTISTS.

1,377,680.     Specification of Letters Patent.     Patented May 10, 1921.

Application filed March 17, 1921. Serial No. 453,175.

*To all whom it may concern:*

Be it known that I, LOYD R. HAIGHT, a citizen of the United States, residing at Spokane, in the county of Spokane and State of Washington, have invented certain new and useful Improvements in Amalgam-Mixers for Dentists, of which the following is a specification.

My invention relates to amalgam mixers for dentists. An object is to provide a device of this character which will mix amalgam for use as fillings for teeth in an expeditious and economical manner and which may be attached and operated from dental engines of different kinds now in use.

The full objects and advantages of my invention will appear in connection with the detailed description, and the novel features embodied in my inventive idea will be particularly pointed out in the claims.

In the accompanying drawings which illustrate my invention in one of its embodiments,—

Figure 1 is a side elevational view showing my mixer attached to a dental engine for operation thereby. Fig. 2 is a view of the mixer in section on the line 2—2 of Fig. 4. Fig. 3 is a view in section on the line 3—3 of Fig. 2. Fig. 4 is a view in section on the line 4—4 of Fig. 1. Fig. 5 is a view in section on the line 5—5 of Fig. 4.

Referring to the drawings in which Fig. 1 shows a portion of a dental engine sufficient to illustrate the manner in which my mixer is attached, the numeral 10 designates a portion of a bracket from which extends a support 12 which supports a motor and outwardly extending arms 16 and 18 adjacent which runs a belt 20 driven from the motor. It is obvious that these parts may be those which are employed in any of the dental engines which are used by dentists having a belt for operating the various tools. My mixer is adapted to be clamped to the arms 16 and 18 at a suitable place thereon, such as shown in Fig. 1. The supporting portion of my mixer including a plate 22 of suitable material such as brass, or other metallic substance, from which extends a number of lugs 24, 26, 28 and 30. When mounted on the dental engine in the manner shown, the lug 26 extends above and the lug 28 below the arm 16, while the lug 30 extends above the arm 18. A plate 32 is adapted to rest upon the ends of the lugs 26 and 30 and is held thereto by screws 34 and 36 passing through holes in this plate and engaging threads tapped into the lugs. When the screws are turned down the supporting portion will be firmly clamped in place. The lug 24 is hollow and constitutes a bearing for a shaft 38 on one end of which is secured a grooved pulley 40 lying adjacent the plate 22. The other end of the shaft 38 is tapped with threads to receive the threads of a screw 42 for securing a washer 44 on the end of the shaft. Secured to the face of the pulley 40 is a crankpin 46 adapted to slide in a slot 48 in the upper portion of a lever 50 pivoted upon a screw 52, the threads of which engage threads tapped into the lug 28, a spacing sleeve 54 being placed between the lever and the plate 22. Secured to the lower end of the lever 50 is a holder, one end of which is shaped to form a depending cup-shaped member 56. Extending slidably through the body of the holder is a rod 58 to one end of which is secured a member, the lower portion 60 of which is cup-shaped and the upper portion of which is provided with a squared socket slidably fitting the squared end 62 of the holder. This holder is provided with a chamber for receiving a coiled spring 64 which encircles the rod 58 and is held between the end of the chamber and a sleeve 66 secured on the rear end of the rod. The cup-shaped members 56 and 60 face each other and are adapted to hold between them a receptacle for containing the amalgam to be mixed. For convenience, this receptacle may consist of a gelatin capsule having the two parts 68 and 70 telescopically fitting each other.

The operation and advantages of my invention will be readily understood from the foregoing description. When it is desired to use the device, the amalgam to be mixed is placed in the capsule and upon forcing the cup member 60 outwardly against the tension of the spring 64, the receptacle may be readily placed between the two cup-shaped members so that when the slidable one is released the receptacle will be firmly held between the two cup-shaped members. The stretch of the belt 20 which runs adjacent the pulley 40 is then pulled upwardly and placed in the groove of the pulley, as shown in Fig. 1, whereupon the receptacle containing the amalgam will be rapidly oscillated to cause a thorough mixing of the amalgam which operation is quickly effected. The use of my device insures greater cleanliness, since the liability of foreign substances such as dirt and oil being mixed in is eliminated, which undesirable result is apt to happen when the amalgam is mixed in the palm of the hand. The amalgam is not wasted, as is the case when a mortar and pestle are used in which case the amalgam sticks to the sides of the mortar. My device is small and is out of the way, and does not interfere with the customary operation of the dental engine. No special power unit is required to operate my mixer since it may be fastened in place and operated by the belt or cord of various dental engines. My device is of simple construction having no parts liable to wear out rapidly or get out of order, and it is economical in regard to manufacturing cost. The use of my device saves the time of the dentist since he can remain at the operating chair and while the amalgam is being mixed can dry the cavity and place it in readiness for receiving the filling as soon as the amalgam is sufficiently mixed.

I claim:

1. An amalgam mixer comprising a support adapted to be attached to a dental engine, a receptacle for amalgam carried by said support, and means for causing the amalgam in said receptacle to be mixed by the operation of the customary belt of the engine.

2. An amalgam mixer comprising a support adapted to be attached to a dental engine, a receptacle for amalgam carried by said support, and means for oscillating said receptacle by the operation of the customary belt of the engine.

3. An amalgam mixer comprising a support adapted to be attached to a dental engine, a pulley mounted on said support and adapted to be engaged by the customary belt of the engine, a receptacle for amalgam carried by said support, and means for causing the amalgam in said receptacle to be mixed by the rotation of said pulley.

4. An amalgam mixer comprising a support adapted to be attached to a dental engine, a pulley mounted on said support and adapted to be engaged by the customary belt of the engine, a lever pivoted upon said support, a crank pin on said pulley connected to one end of said lever, a holder on the other end of said lever, and a receptacle for amalgam adapted to be held by said holder.

5. An amalgam mixer comprising a support adapted to be attached to a dental engine, a pulley mounted on said support and adapted to be engaged by the customary belt of the engine, a lever pivoted upon said support, a crank pin on said pulley connected to one end of said lever, a cup-shaped member fixed to the other end of said lever, a slidable cup-shaped member mounted to face said fixed cup-shaped member, means resiliently holding said cup-shaped members in spaced relation, and a receptacle for amalgam adapted to be inserted between said cup-shaped members when said slidable member is forced away from said fixed member.

6. An amalgam mixer comprising a supporting plate, lugs extending out from said plate and adapted to rest upon the arms of a dental engine, a second plate adapted to be secured to the outer ends of said lugs for clamping said supporting plate in position, a pulley mounted on said supporting plate and adapted to be engaged by the customary belt of the engine, a lever pivoted upon said supporting plate, a crank pin on said pulley connetced to one end of said lever, a holder on the other end of said lever, and a receptacle for amalgam adapted to be held by said holder.

In testimony whereof I hereunto affix my signature.

LOYD R. HAIGHT.